United States Patent [19]

Magne et al.

[11] Patent Number: 5,073,903
[45] Date of Patent: Dec. 17, 1991

[54] INFORMATION TRANSMISSION ARRANGEMENT USING FREQUENCY MODULATION

[75] Inventors: François Magne, Paris; Marc Chelouche, Sannois, both of France

[73] Assignee: U.S. Philips Corp., New York, N.Y.

[21] Appl. No.: 452,859

[22] Filed: Dec. 18, 1989

[30] Foreign Application Priority Data

Dec. 27, 1988 [FR] France .................. 88 17229

[51] Int. Cl.⁵ .................................. H04L 27/10
[52] U.S. Cl. .................................. 375/45; 329/300;
332/101; 375/65; 375/88
[58] Field of Search .................. 375/9, 23, 45, 47, 51,
375/62, 65, 86, 88, 121, 1; 329/300; 332/100,
101; 455/86, 87

[56] References Cited

U.S. PATENT DOCUMENTS

| | | | |
|---|---|---|---|
| 3,959,601 | 5/1976 | Olevsky et al. | 375/120 |
| 4,214,208 | 7/1980 | O'Donnell | 375/121 |
| 4,438,519 | 3/1984 | Bose | 375/23 |
| 4,468,792 | 8/1984 | Baker et al. | 375/45 |
| 4,606,049 | 8/1986 | Daniel | 375/45 |
| 4,849,998 | 7/1989 | Poklemba | 375/121 |

*Primary Examiner*—Benedict V. Safourek
*Assistant Examiner*—Young Tse
*Attorney, Agent, or Firm*—Jack D. Slobod

[57] ABSTRACT

A control circuit (10) controls a voltage controlled oscillator (15) to cause the signal at the output of the oscillator to have slopes of frequency variation in accordance with biphase encoded data to be transmitted. The control circuit (10) limits abrupt frequency shifts in the oscillator output signal by inverting a sign multiplying the slope of frequency variation, utilizing an amplifier (50) with a controllable inversion state, in response to whether the state of the data to be transmitted, and a state, indicative of whether a frequency control voltage exceeds a zero threshold at sampling instants synchronous with the biphase data, are the same or different.

15 Claims, 3 Drawing Sheets

INFORMATION TRANSMISSION ARRANGEMENT USING FREQUENCY MODULATION

BACKGROUND OF THE INVENTION

The present invention relates to an information transmission arrangement using frequency modulation, the arrangement being formed by at least one sending unit comprising:

a sending circuit built up around an oscillator having a frequency control input, for sending an information transmission wave, a frequency control circuit to supply to said control input signals having frequency-variation amplitudes and variation slopes depending on the information to be transmitted, and at least one receiving unit comprising:

a receiving circuit to receive said wave and produce a signal to be demodulated, a demodulation circuit to receive the signal to be demodulated and recover said information for supply to a user circuit.

Such arrangements are well known. For example, on this subject the reader be referred to the article by G. DAVID et al. entitled "Transmission radioélectrique au moyen d'une modulation linéaire en fréquence" published in the journal L'ONDE ELECTRIQUE, March 1971, Vol. 51, Fascicle 3, pp. 233-242.

In this known arrangement, the information constituted by bits having the values "1" and "0" is transmitted by assigning slopes having the value "p" to the "1" bits and slopes having the value "−p" to the "0" bits.

The above article deals with all the advantages of this type of transmission link: more specifically, resistance to jamming and improvement of the signal-to-noise ratio at the receiving end when using correlation techniques. However, with an arrangement of this type one is confronted with disturbing effects produced at each discontinuity of the frequency occurring abruptly between the successive bits having the same value.

SUMMARY OF THE INVENTION

The present invention proposes an arrangement of the type mentioned in the preamble which avoids any discontinuity in the frequency variations, whatever the bit sequence to be transmitted may be.

To this purpose an arrangement is characterized in that the control circuit comprises means for changing the slope sign controlled by means for detecting amplitude variations.

BRIEF DESCRIPTION OF THE DRAWINGS

The following description together with the accompanying drawings, all given by way of non-limiting example, will make it better understood how the invention can be realized. In the drawings.

DETAILED DESCRIPTION OF THE PREFERRED EMBODIMENTS

Figure 1:
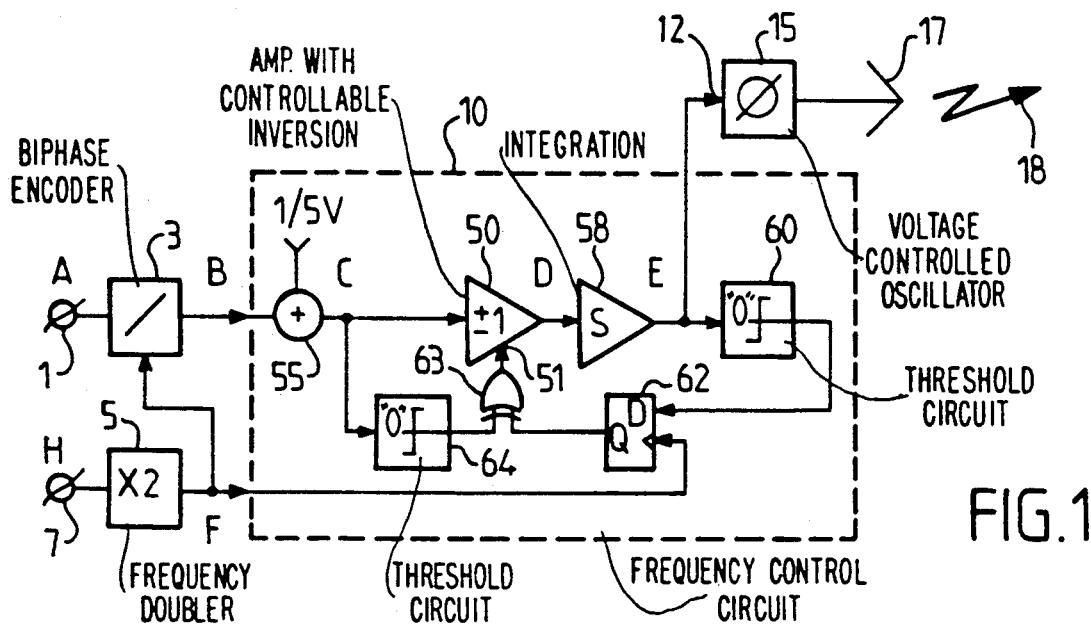
FIG. 1 shows the diagram of a sending unit forming part of the arrangement according to the invention.
Figure 2:
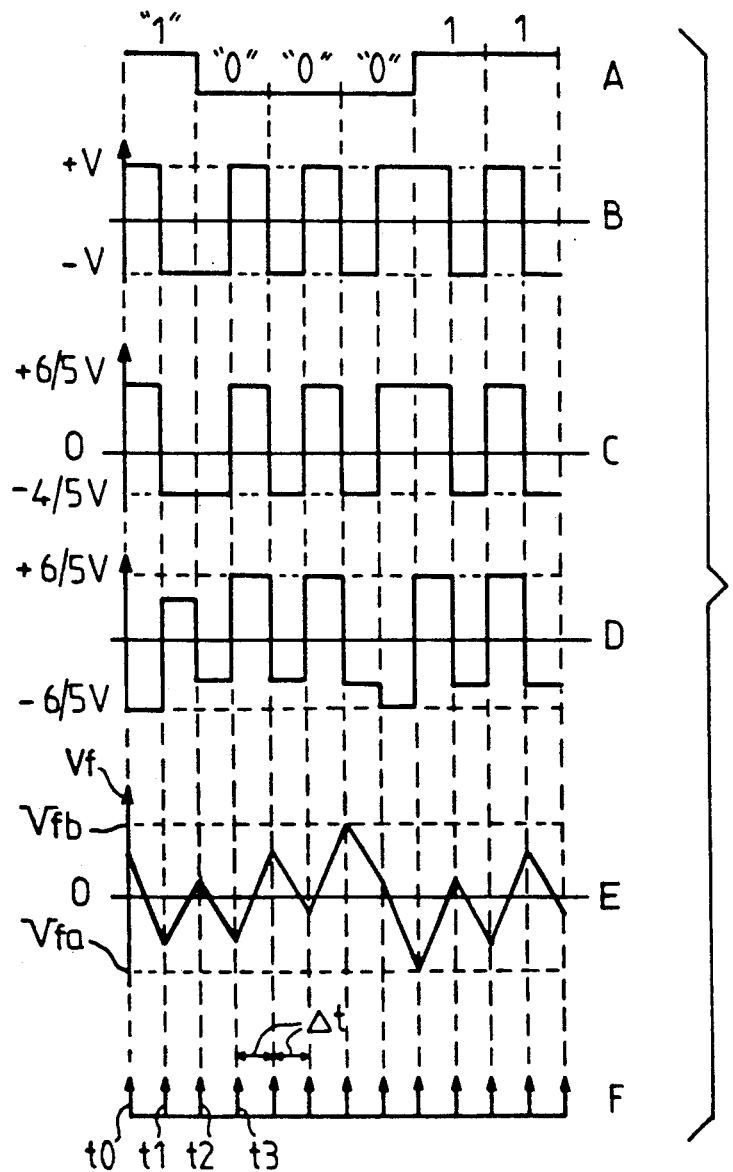
FIG. 2 shows the shape of signals which are present inside the sending unit of FIG. 1.

In FIG. 1 is shown a sending unit suitable for use in an arrangement according to the invention. Reference numeral 1 indicates the input terminal to which a signal A representing the data to be transmitted is applied, for example, a sequence of "1" and "0" like:

1, 0, 0, 0, 1, 1, ...

as represented in FIG. 2, line A. In order to facilitate the recovery of the data after of their transmission, these data are encoded in a biphase code by the encoder 3 by means of a signal F from a frequency doubler 5 doubling the frequency of the clock signals H applied to the terminal 7 and accompanying the data to terminal A. The biphase code thus formed is represented at B in FIG. 2. This signal develops from −V to +V Volts. Each of these values will be transmitted by means of a variable slope frequency modulation. The signals B are applied to a freqency control circuit 10 which produces, in response to the signals B, the signal at the control input 12 of an oscillator 15 whose frequency varies in response to the voltage applied to its control input 12. An aerial 17 sends a wave 18 produced by the oscillator 15.

Figure 3:
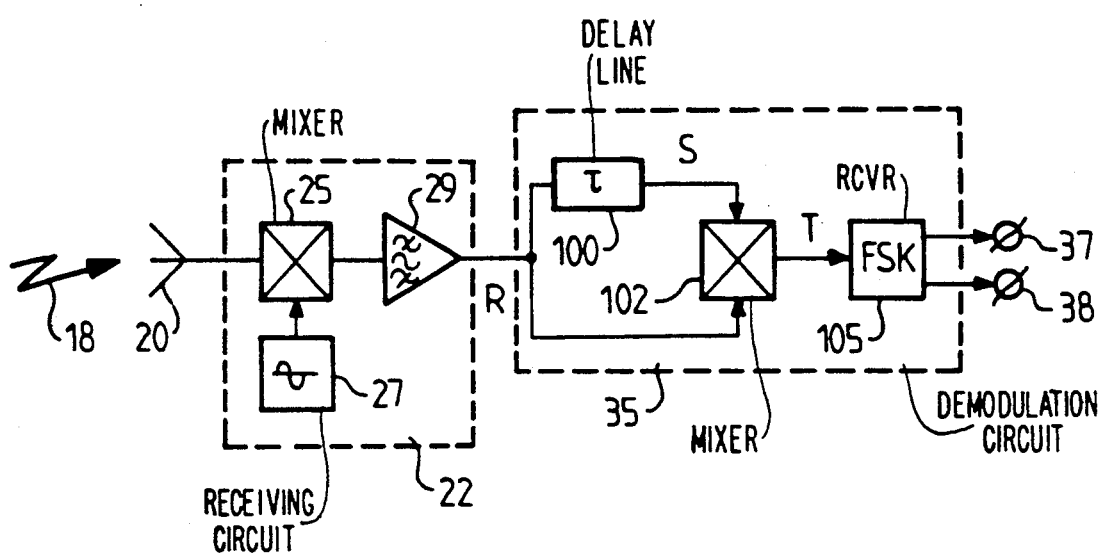
FIG. 3 shows the diagram of a receiving unit forming part of an arrangement according to the invention.

The receiving unit, shown in FIG. 3, comprises a receiving aerial 20 to capture wave 18 so that receiving circuit 22 can produce a signal which is easy to demodulate. The circuit effects a frequency change obtained by means of a mixer 25 and an oscillator 27 and an intermediate-frequency amplification provide by an amplifier 29. The output signals R of this circuit 22 are applied to a demodulation circuit 35 which applies the demodulated signals to an output terminal 37 and the clock signals correpsonding to these demodulated signals to terminal 38.

The modulation used by the arrangement according to the invention is a frequency modulation which makes a slope p1 of frequency variation dF1 for a period of time dt1 correspond to a first signal value B (+V):

$$p1 = \frac{dF1}{dt1}$$

and a slope p2 of a frequency variation dF2 for a period of time dt2 correspond to a second signal value B (−V):

$$p2 = \frac{dF2}{dt2}.$$

According to the invention, in order to avoid frequency discontinuities occurring at the changes of the slopes, the control circuit 10 (FIG. 1) comprises means to change the slope sign which are constituted by a programmable amplifier 50 whose gain may assume two values +1 and −1 in response to logic signals "1" and "0" respectively, applied to its programming input 51. The input of this amplifier receives a signal C from a summing circuit 55 which adds a voltage (1/5)V to the signal B. The signal D at the output of the amplifier 50 is applied to an integrating circuit 58 supplying a signal E in the direction of the frequency control input 12 of the osciallator 15. This signal is a voltage Vf varying from $-Vf_a$ to $+Vf_b$ volts. This corresponds, according to a linear relationship, to frequencies $f_o-f_a$ and $f_o+f_b$, where $f_o$ corresponds to a zero voltage. The signal E is also supplied to the input of a threshold circuit 60 which produces a logic signal "0" at its output for a negative voltage applied to its input and a logic signal "1" for a positive or zero voltage. A D-flip-flop 62 receives at its data input the signal produced by the circuit 60 and at its clock input the signal F. The output signal of this flip-flop is applied to the input of the programming input 51 of the amplifier 50 via an EXCLUSIVE-OR gate 63 also receiving a signal from a second threshold circuit 64 whose input receives the signal C. This threshold circuit 64 produces a logic signal "0" for a negative voltage applied to its input and a logic signal "1" for a positive or zero voltage.

Now it is possible to explain the operation of the control circuit 10. Reference is made to FIG. 2 where signal B is examined; this develops from $+V$ to $-V$ and it is proposed to associate to the value $+V$ a variation slope p1 and to the value $-V$ a variation slope p2, p1 and p2 being considered as absolute values.

By means of the summing circuit 55 the levels are shifted by $(1/5)V$ such that when the signal B is equal to $+V$ the signal C is equal to $(6/5)V$ and when the signal B is equal to $-V$ the signal C is equal to $-(4/5)V$. The rest of the arrangement will make the values $(6/5)V$ and $-(4/5)V$ correspond proportionally to the slopes p1 and p2:

$$p1 = \pm k(6/5).V$$

$$p2 = \pm k(4/5).V$$

The choice of the signs + or − specifically depends on the signal applied to the contoller 51 and k is a proportionality constant.

The instant $t_0$ is considered at which the voltage is assumed to be $Vf>0$. At this instant an active edge of the signal F appears; this causes a value "1" coming from the circuit 60 to be written into the flip-flop 62. The gate 63, also receiving a signal "1" from the circuit 64, thus produces a "0". The amplifier 50 is put in the inverting position so that the signal D assumes the value $(-6/5).V$ corresponding to the value of the signal C. The signal E linearly develops from a positive value Vf to a negative value between the instants $t_0$ and $t_1$, the latter occurring when the next active edge of the clock signal F appears. Since the value E is negative before instant $t_1$, the amplifier 50 is put in the inverting position after this instant because the EXCLUSIVE-OR gate produces a signal of the value "0" in response to signals "0" from the flip-flop 62 and the threshold circuit 64, respectively. The voltage E develops with the slope p2 from a negative voltage to an other, positive voltage at the instant $t_2$ where an active edge of the signal F occurs. After this instant the signal at the output of the gate 63 becomes "1" because the signals at the outputs of the elements 62 and 64 become equal to "1" and "0", respectively. At the instant $t_3$ the voltage E is negative which causes the signal at the output of the flip-flop 62 to be "0" and, since the signal C becomes positive, at this instant the amplifier 50 is put in the non-inverting position so that the voltage E becomes positive again after a period of time $\Delta t$ and so on. The sequel of the argumentation could be given by means of that which has been set forth above. It is to be noted that the voltage Vf could never exceed the values $Vf_b$ and $-Vf_a$ during the selected values of the edges p1 and p2 and the amplitude values of the signal C.

In FIG. 3 is shown diagrammatically the structure of the demodulation circuit 35. It comprises a delay line 100 to delay the signal R at the output of the circuit 22 by $\tau$. A mixer 102 carriers out the mixing of the signals R and S (at the output of line 100).

Figure 4:
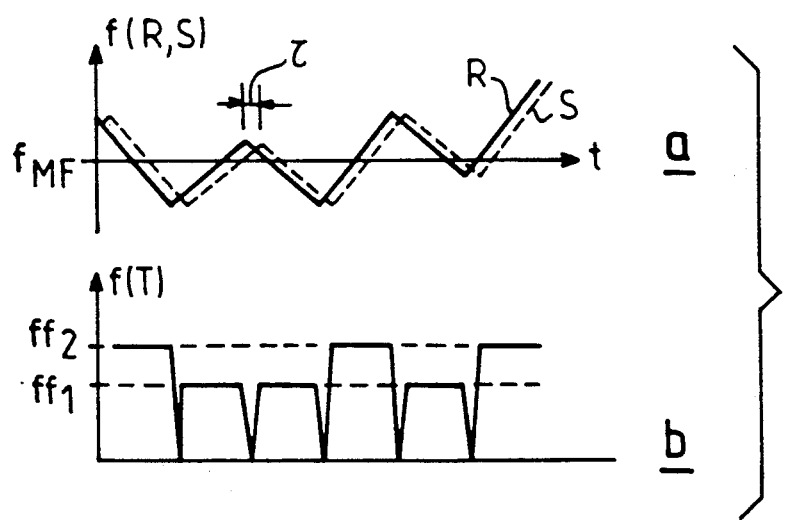
FIG. 4 shows the shape of signals present inside the receiving unit of FIG. 3.

In FIG. 4a the frequency variations of the signals R and S are represented; it can be shown that the signal T from the mixer 102 produces signals of frequency ff1 and ff2 representing the slopes p1 and p2 according to:

$$ff1 = p1.\tau$$

$$ff2 = p2.\tau$$

Fig. 4b shows the corresponding frequency variations of the signal T. A conventional FSK receiver 105 connected to the output of the mixer 102 restores the data at the terminal 37 and the clock signal at the terminal 38.

Figure 5:
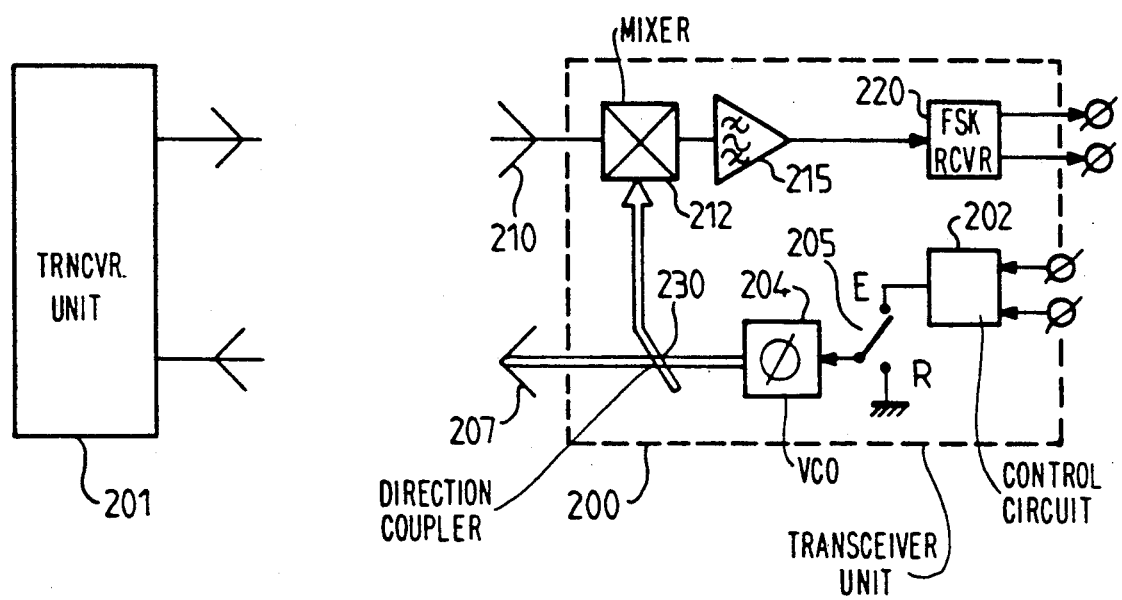
FIG. 5 shows an arrangement comprising transceiver units each constituted by a sending unit and a receiving unit shown in FIGS. 1 and 3.

FIG. 5 shows how such an arrangement can alternately operate in the send and receive modes. In this Figure are shown two transceiver units 200 and 201 having identical structures. Only unit 200 is shown in detail. As for its sending part it comprises a control circuit 202 of an identical structure to that of circuit 10 receiving already biphase-encoded data. The output signal of this circuit 202 is applied to the frequency control input of a send oscillator 204 via a switch circuit 205 in the send position (E). An aerial 207 transmits the wave generated in response to the output signals of the oscillator 204.

The receiving part comprises a receiving aerial 210, a mixer 212, an intermediate-frequency amplifier 215 and an FSK receiver 220 to recover the data. In this arrangement the send oscillator 204 is also used as a local oscillator for the receiving part. To this purpose, a directional coupler 230 derives a part of the wave at the output of the oscillator 204 whereas its frequency control signal receives a fixed voltage via the switch circuit 205 which has been put in the receive position (R).

To illustrate the above explanation, the following orders of magnitude are given:

carrier wave frequency 18: ~55 GHz
dF1~180 MHz dF2~120 MHz ff1=18 MHz ff2=12 MHz for $\tau=50$ ns and $dt1=dt2=\Delta t=0.5$ μs.

Although an example has been described in which the biphase code is used for transmitting the data, it will be evident that this invention also covers any further encoding methods: HDB3 codes or the like, codes obtained after scrambling, etc.

We claim:
1. Information transmission apparatus comprising:
a sending circuit, including an oscillator having a frequency control input, for forming a frequency modulated signal to be transmitted in response to a frequency control signal at said frequency control input; and
a frequency control circuit having an input for a digital input information signal, said frequency control circuit being for supplying said frequency control signal in a form to change a slope of frequency variation of the frequency modulated sig- nal as a function of the state of said input information signal;

wherein the control circuit comprised means for determining a state of the frequency control signal, and a controllable sign inverting means having a non-inverting state and an inverting state for causing inversion of a sign multiplying the slope of frequency variation of the frequency modulated signal as a function of the states of said input information signal and said frequency control signal.

2. The apparatus of claim 1, wherein said means for determining the state of the frequency control signal determines said state at instants sychronous with said input information signal.

3. The apparatus of claim 1, wherein the frequency of the frequency modulated signal is determined by the amplitude of the frequency control signal and wherein the means for determining the state of the frequency control signal comprises threshold circuit means for comparing the amplitude of the frequency control signal with a predetermined threshold.

4. The apparatus of claim 2, wherein the frequency of the frequency modulated signal is determined by the amplitude of the frequency control signal and wherein the means for determining the state of the frequency control signal comprises threshold circuit means for comparing the amplitude of the frequency control signal with a predetermined threshold.

5. The apparatus of claim 1, wherein said controllable sign inverting means causes inversion of said sign as a function of whether the state of the input information signal and the frequency control signal are the same or different.

6. The apparatus of claim 3, wherein said controllable sign inverting means causes inversion of said sign as a function of whether the states of the input information signal and the frequency control signal are the same or different.

7. The apparatus of claim 2, wherein said controllable sign inverting means causes inversion of said sign as a function of whether the states of the input information signal and the frequency control signal are the same or different.

8. The apparatus of claim 4, wherein said controllable sign inverting means causes inversion of said sign as a function of whether the states of the input information signal and the frequency control signal are the same or different.

9. The apparatus of claim 1, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

10. The apparatus of claim 3, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

11. The apparatus of claim 4, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

12. The apparatus of claim 5, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

13. The apparatus of claim 6, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

14. The apparatus of claim 7, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

15. The apparatus of claim 8, further comprising a receiving unit comprising a receiving circuit to receive a transmitted frequency modulated signal, means for shifting the frequency of said transmitted frequency modulated signal by the frequency of said oscillator, and means including a transmit/receive switch for controlling the frequency of said oscillator.

* * * * *